United States Patent
Semper et al.

(10) Patent No.: US 8,285,299 B2
(45) Date of Patent: Oct. 9, 2012

(54) MOBILE RELEASE MESSAGE

(75) Inventors: William J. Semper, Richardson, TX (US); Purva R. Rajkotia, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 828 days.

(21) Appl. No.: 11/272,314

(22) Filed: Nov. 10, 2005

(65) Prior Publication Data
US 2007/0105539 A1 May 10, 2007

Related U.S. Application Data

(60) Provisional application No. 60/651,577, filed on Feb. 10, 2005.

(51) Int. Cl.
*H04W 24/00* (2009.01)

(52) U.S. Cl. .................................... 455/456.1
(58) Field of Classification Search ............... 455/404.2, 455/456.1
See application file for complete search history.

(56) References Cited

U.S. PATENT DOCUMENTS

| | | | | |
|---|---|---|---|---|
| 5,835,860 A | * | 11/1998 | Diachina | 455/458 |
| 5,878,397 A | * | 3/1999 | Stille et al. | 455/466 |
| 6,052,565 A | * | 4/2000 | Ishikura et al. | 455/67.11 |
| 6,061,566 A | * | 5/2000 | Friman | 455/445 |
| 6,119,000 A | * | 9/2000 | Stephenson et al. | 455/432.1 |
| 2002/0072376 A1 | * | 6/2002 | Carlsson et al. | 455/456 |
| 2003/0169725 A1 | * | 9/2003 | Ahmavaara et al. | 370/352 |
| 2005/0207396 A1 | * | 9/2005 | Vaittinen et al. | 370/352 |
| 2005/0237977 A1 | * | 10/2005 | Sayeedi | 370/331 |

OTHER PUBLICATIONS

Vibhor Julka, et al. *New A1 Procedures for Efficient HRPD AN Resource Management at Handoff from HRPD to 1x*, Ericsson Inc., 3rd Generation Partnership Project 2 "3GPP2" A40-2005110-0nn Eric. A1HO Related Procedures, Year 2005, pp. 1-5.

* cited by examiner

*Primary Examiner* — Lester Kincaid
*Assistant Examiner* — Joel Ajayi

(57) ABSTRACT

A system for wireless communication is provided that includes a mobile switching center and a communication component, such as a base station or an access network. The mobile switching center is operable to transmit a message identifying a mobile station to be released. The communications component is operable to receive the message from the mobile switching center. The communications component is further operable to identify and release the mobile station based on the message.

20 Claims, 3 Drawing Sheets

| 7 | 6 | 5 | 4 | 3 | 2 | 1 | 0 | Octet |
|---|---|---|---|---|---|---|---|---|
| BSMAP Header: Message Discrimination=[00H] ||||||||  1 |
| Length Indicator (L1)=<variable> |||||||| 2 |
| Message Type=[TBD] |||||||| 3 |
| Mobile Identity (IMSI/ESN): A1 Element Identifier=[0DH] |||||||| 1 |
| Length=[05H–08H] (10–15 digits) |||||||| 2 |
| Identity Digit 1=[0H–9H] (BCD) ||||| Odd/Even Indicator=[1,0] | Type of Identity =[101(ESN), 110 (IMSI)] || 3 |
| IF (Type of Identity=101), Identity {1: |||||||||
| (MSB) | ESN=<any value> ||||||| 4 |
|  |  |  |  |  |  |  |  | 5 |
|  |  |  |  |  |  |  |  | 6 |
|  |  |  |  |  |  |  | (LSB) | 7 |
| } OR IF (Type of Identity=110), Identity {1: |||||||||
| Identity Digit 3=[0H–9H] (BCD) |||| Identity Digit 2=[0H–9H] (BCD) |||| 4 |
|  |  |  |  |  |  |  |  | ... |
| Identity Digit N+1=[0H–9H] (BCD) |||| Identity Digit N=[0H–9H] (BCD) |||| n |
| =[1111](if even number of digits) |||| Identity Digit N+2=[0H–9H] (BCD) |||| n+1 |
| } Type of Identity |||||||||
| Cause: A1 Element Identifier=[04H] |||||||| 1 |
| Length=[01H] |||||||| 2 |
| ext=[0] | Cause Value= [07H (OAM&P intervention), 0DH (Timer expired), 0EH (Better cell), 0FH (Interference), 17H (Time critical relocation/handoff), 18H (Network optimization)] ||||||| 3 |

FIG.4

MOBILE RELEASE MESSAGE

CROSS-REFERENCE TO RELATED APPLICATIONS AND CLAIM OF PRIORITY

The present invention is related to that disclosed in U.S. Provisional Patent Application Ser. No. 60/651,577 filed Feb. 10, 2005 entitled "Mobile Release Message". U.S. Provisional Patent Application Ser. No. 60/651,577 is assigned to the assignee of the present application. The subject matter disclosed in U.S. Provisional Patent Application Ser. No. 60/651,577 is hereby incorporated by reference into the present disclosure as if fully set forth herein. The present invention hereby claims priority under 35 U.S.C. §119(e) to U.S. Provisional Patent Application Ser. No. 60/651,577.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure relates to mobile telephony. More specifically, but not by way of limitation, a method and system are provided that allow a connectionless mobile release message to be sent from a mobile switching center to release a mobile station.

BACKGROUND OF THE INVENTION

Among the components typically present in a mobile telephony system are a mobile switching center (MSC), a base station or access network, and a mobile station. The mobile station is a mobile telephone, handset or mobile telecommunications device user by a subscriber to a mobile telephony service to place and receive calls via the mobile telephony service. The base station contains the fixed equipment with which multiple mobile stations can communicate. In situations where data rather than voice communication is being transmitted, the term 'access network' might be used to refer to and describe the equipment that performs functions similar to those performed by a base station. The MSC acts as a switching point that connects multiple base stations to the public switched telephone network, to mobile telephony-based networks, or to other networks. The communication link between a mobile station and a base station can be referred to as a traffic channel.

SUMMARY OF THE INVENTION

In one embodiment, a system for wireless communication is provided that includes a mobile switching center and a communication component, such as a base station or an access network. The mobile switching center is operable to transmit a message identifying a mobile station to be released. The communications component is operable to receive the message from the mobile switching center. The communications component is further operable to identify and release the mobile station based on the message.

In another embodiment, a method for instructing a communications component to release a mobile station is provided. The method includes a mobile switching center sending a message to the communications component. The communications component receives the message from the mobile switching center and determines, from information in the message, which mobile station the message applies to. The communications component releases the mobile station in response to receiving the message.

In another embodiment, a message is provided for a mobile switching center to instruct a system, such as a base station or an access network, to release a mobile station. The message includes a header section, a mobile identity section and a cause section. The mobile identity section contains information for the system to identify the mobile station the system is to release in response to receiving the message. The cause section contains information related to the message.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

FIG. 4 illustrates a mobile release message according to an embodiment of the present disclosure.

DETAILED DESCRIPTION OF THE PREFERRED EMBODIMENTS

It should be understood at the outset that although an exemplary implementation of one embodiment of the present invention is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

When a communication link is established between a mobile station and a base station, the base station (or access network depending upon whether the traffic is data or voice) assigns a dedicated traffic channel to the link. At any one time, a single base station might maintain a separate traffic channel for each of multiple mobile stations with which it is communicating. For voice calls, at the same time that the base station assigns a traffic channel to a mobile station, the base station establishes a dedicated signaling link to the MSC. For each traffic channel between a mobile station and the base station, there is a corresponding dedicated signaling link to the MSC. Therefore, when the MSC and the base station communicate on a specific signaling link, it is implied that the communication relates to the corresponding base station-mobile station traffic channel.

Figure 1:
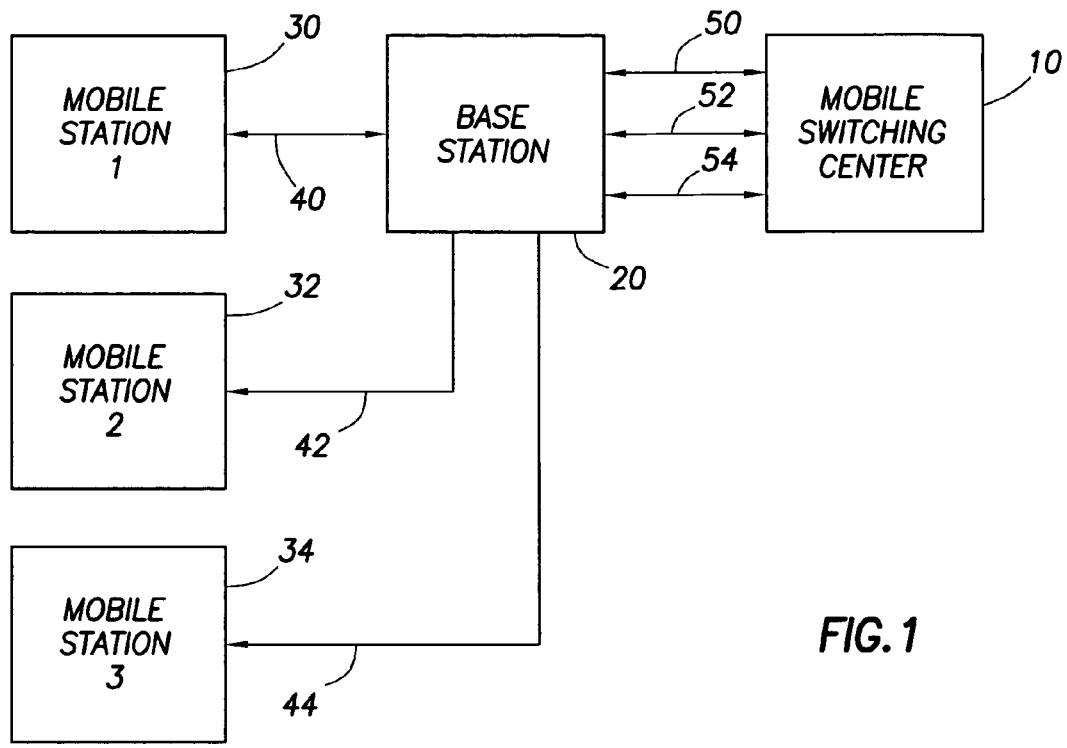
FIG. 1 illustrates an early traffic channel scenario for a mobile release message according to an embodiment of the present disclosure.

This arrangement is illustrated in FIG. 1. An MSC 10 is in communication with a base station 20, which is in communication with a plurality of mobile stations. In this embodiment, a first mobile station 30, a second mobile station 32, and a third mobile station 34 are present, but in other embodiments other numbers of mobile stations could be present. The base station 20 communicates with mobile station 30 over a first traffic channel 40, with mobile station 32 over a second traffic channel 42, and with mobile station 34 over a third traffic channel 44. The base station 20 communicates with the MSC 10 over a first dedicated signaling link 50, a second dedicated signaling link 52, and a third dedicated signaling link 54.

Traffic channel 40 in this example correlates with dedicated signaling link 50. Therefore, when the MSC 10 communicates with the base station 20 via signaling link 50 it is implied that this communication relates to the first mobile station 30 communicating with base station 20 on traffic channel 40. Similarly, traffic channel 42 in this example correlates to dedicated signaling link 52. When the MSC 10 communicates with the base station 20 via signaling link 52 it implies that the communication relates to the second mobile station 32 communicating with base station 20 on traffic channel 42. Traffic channel 44 correlates to dedicated signaling link 54. When the MSC 10 communicates with the base station 20 via signaling link 54 it implies that the communication relates to the third mobile station 34 communicating with base station 20 on traffic channel 44.

A message sent from the MSC 10 to a mobile station 30, 32, or 34 over a particular traffic channel/dedicated signaling link combination does not necessarily contain information identifying the mobile station 30, 32, or 34 to which the message is to be sent. Instead, the base station 20 can determine the mobile station 30, 32, or 34 to which the message is to be sent by identifying the traffic channel/dedicated signaling link combination on which the message has been placed. Since each traffic channel/dedicated signaling link combination is associated with a single mobile station 30, 32, or 34, identifying the traffic channel/dedicated signaling link combination on which a message has been placed identifies the mobile station 30, 32, or 34 for which the message is intended.

Under existing technology, if the MSC 10 wanted to cease communication between the base station 20 and a mobile station, mobile station 30 for example, the MSC 10 would send what is known as a Clear Command to the base station 20 via signaling link 50. The base station 20 would identify that the Clear Command, received on signaling link 50, relates to traffic channel 40 and would cease communication with mobile station 30. The Telecommunications Industry Association's standard TIA-2001-C, "Interoperability Specification for CDMA2000 Access Network Interfaces", specifies that the Clear Command is to be sent over a dedicated signaling link, such as dedicated signaling link 50. Since the Clear Command does not contain information identifying a particular mobile station, the base station must use the signaling link to determine which mobile station should be released. In some situations however, described in more detail below, the dedicated signaling link 50 between the MSC 10 and the base station 20 might not be present. If it is desired to have the base station 20 cease attempting to communicate with the mobile station 30 in such situations, a Clear Command could not be used because a dedicated signaling link over which the Clear Command could be sent has not yet been established.

In one embodiment, the present disclosure provides a message or mobile release message that is sent from an MSC to a base station to tell the base station to release a mobile station. The mobile release message is referred to as connectionless in the sense that it can be sent from an MSC to a base station without the need of a dedicated connection, such as signaling link 50, between the MSC and the base station.

As used herein, the expression 'releasing a mobile station' and the like can refer to disconnecting a traffic channel that has already been established, ceasing to attempt to establish a traffic channel that has not yet been established, or ceasing to transmit data on a traffic channel to which a mobile station has been connected. Also, when a mobile release message is said to be sent to a base station, it should be understood that the mobile release message could equivalently be sent to an access network or other similarly functioning systems.

FIG. 1 may be used to illustrate one of the scenarios in which a mobile release message might be used. In this case, which can be referred to as an early traffic channel assignment scenario, a traffic channel gets established before a corresponding dedicated signaling link is established. For example, traffic channel 40 might be established before dedicated signaling link 50 is established. If the traffic channel 40 became unnecessary, e.g., if it were determined that the base station 20 is connected to an incorrect mobile station 30, it might be desirable to release the mobile station 30 before the dedicated signaling link 50 is established. Under existing technology, a Clear Command could not be used to accomplish the release because a dedicated signaling link would not exist over which the Clear Command must be sent to identify the particular mobile station. According to one embodiment, the present disclosure provides a mobile release message that may be used in this instance to release the mobile station 30. The mobile release message includes an identifier or information used by the base station 20 to identify the mobile station 30. The mobile release message may be communicated from the MSC 10 to the base station 20 on a communication channel absent a related signaling link. The mobile release message identifies the mobile station 30 to be released. The base station 20 then releases the communication between the base station 20 and the mobile station 30.

Figure 2:
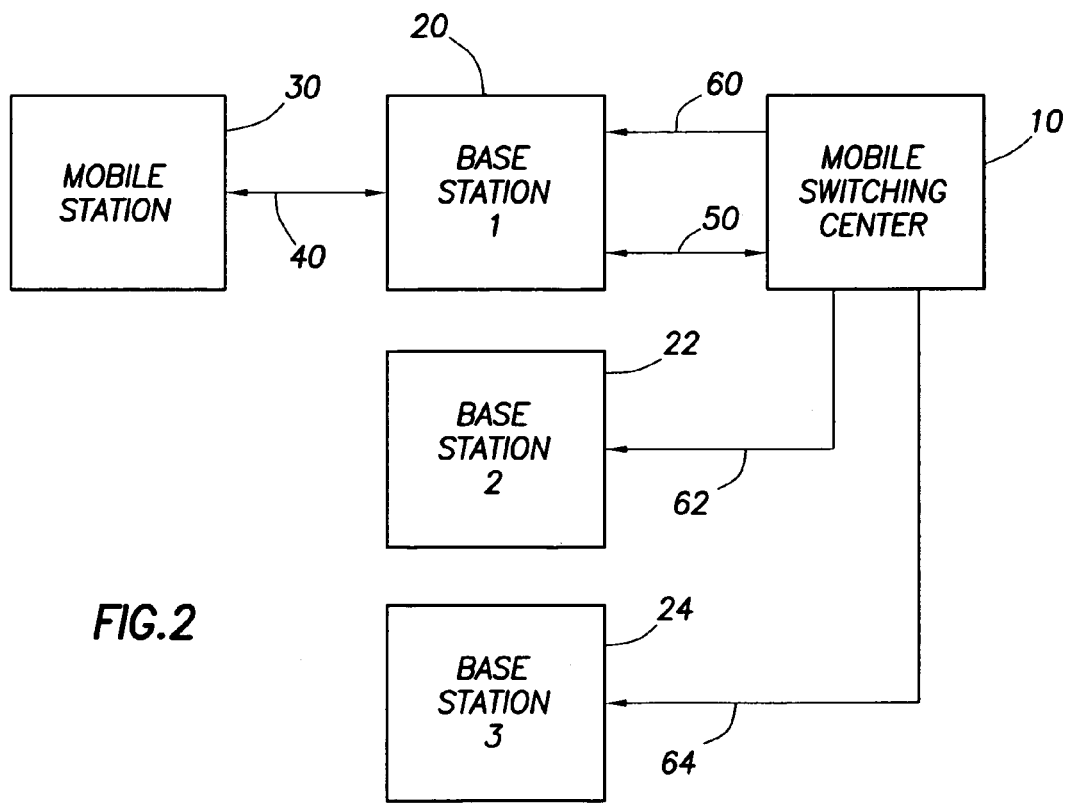
FIG. 2 illustrates a paging scenario for a mobile release message according to an embodiment of the present disclosure.

FIG. 2 illustrates another scenario in which a mobile release message might be used. In this case, which can be referred to as a paging scenario, an MSC 10 is attempting to establish communication with a mobile station 30. The MSC 10 sends pages to several base stations asking the base stations to attempt to locate the mobile station 30. For example, the MSC 10 might send page 60 to a first base station 20, page 62 to a second base station 22, and page 64 to a third base station 24. While three base stations are shown in this embodiment, in other embodiments other numbers of base stations could be present.

If base station 20 locates the mobile station 30, a traffic channel 40 might be established between the mobile station 30 and the base station 20 and a dedicated signaling link 50 might be established between the base station 20 and the MSC 10. Base station 22 and base station 24 would not necessarily be aware that base station 20 has located the mobile station 30 and might continue to attempt to locate the mobile station 30.

It is inefficient for the second and third base stations 22 and 24 to continue to attempt to locate the mobile station 30 since it has already been located by the first base station 20. It might be desirable to instruct the second and third base stations 22 and 24 to stop searching for the mobile station 30. Such an instruction could not be conveyed by a Clear Command because the dedicated signaling links, as discussed above, over which the Clear Command could be transmitted and understood by the base stations would not have been established between the MSC 10 and the second base station 22 or between the MSC 10 and third base station 24. In this case, a mobile release message including information identifying the mobile station 30 to which the message relates may be sent from the MSC 10 to the second base station 22 and the third base station 24. The second and third base stations 22 and 24 identify that the message relates to mobile station 30 and then stop attempting to locate the mobile station 30.

Figure 3:
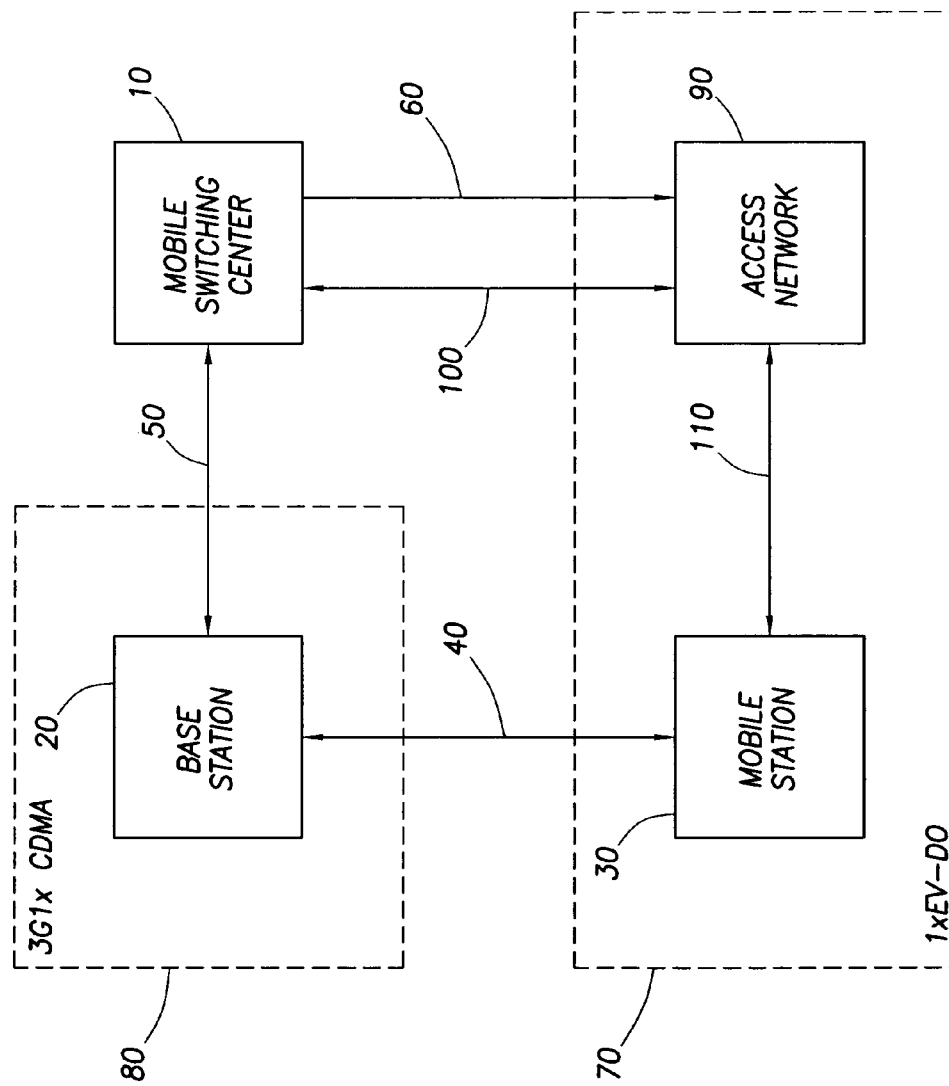
FIG. 3 illustrates an inter-technology page scenario for a mobile release message according to an embodiment of the present disclosure.

FIG. 3 illustrates yet another scenario in which a mobile release message might be used. In this case, which can be referred to as an inter-technology page scenario, an MSC 10 is capable of communicating with multiple networks, such as a high-speed data-based 1xEV-DO network 70 and a voice-based 3G1x CDMA network 80. The 1xEV-DO network 70 includes an access network (AN) component 90. The AN 90 performs a similar function to the base stations described above. However, since the AN 90 is in a data-based, rather than voice-based, network, the AN 90 might use different technology than the base stations.

The MSC 10 communicates with the AN 90 via communication path 100, which may be a different type of communication link than the dedicated signaling links described above. Dedicated signaling links are typically used for voice calls and, since there is typically no voice communication in a 1xEV-DO network 70, dedicated signaling links are not used to communicate with a 1xEV-DO network 70. Instead, the MSC 10 and the AN 90 communicate using connection-less messages. The AN 90 communicates information to the mobile station 30 over a communication path 110 that is similar to the traffic channel 40 between a base station 20 and a mobile station 30, as discussed above.

In this scenario example, the AN 90 might be transmitting data to the mobile station 30 via path 110. During this data transmission, a voice call is placed to the mobile station 30 from another party. The voice call is communicated by the MSC 10 sending a page over signaling link 100 to the AN 90, which delivers this message to the mobile station 30 via traffic channel 110. The mobile station 30 identifies that a voice call has been received, and the user of the mobile station 30 chooses whether to accept the voice call. If the user accepts the voice call, the mobile station 30 then ceases accepting data from the AN 90 and would accept the voice call transmitted from the MSC 10 by establishing a traffic channel 40 with the base station 20. In other words, the mobile station 30 would switch from being a component of the data-based 1xEV-DO network 70 to being a component of the voice-based 3G1x CDMA network 80.

In such a case, the AN 90 would typically not be aware that the mobile station 30 was no longer accepting data from the AN 90 and would continue to attempt to transmit data to the mobile station 30. Since attempting to transmit data to a component that is not accepting data can be inefficient, it might be desirable for the MSC 10 to be able to instruct the AN 90 to stop attempting to transmit data to the mobile station 30 when the mobile station 30 switches from the data-based 1xEV-DO network 70 to the voice-based 3G1x CDMA network 80.

As discussed above, such an instruction cannot be sent via a Clear Command from the MSC 10 to the AN 90 because a Clear Command can be sent only over a dedicated signaling link and a dedicated signaling link was never established between the MSC 10 and the AN 90. Under the current systems, the base stations or AN 90 continue to attempt to establish communication with the mobile station 30 until, for example, the communication times out. The mobile release message of the present disclosure is more efficient and can be sent from the MSC 10 to the AN 90 instructing the AN 90 to stop attempting to transmit data to the mobile station 30. Again the mobile release message includes information to identify the mobile station 30, so that the AN 90 may cease communicating or attempting to communicate with the mobile station 30.

In each of the three scenarios described above, a mobile release message is used to release a mobile station. In an embodiment, the mobile release message follows the format used by other types of messages in the TIA-2001-C standard. An example of the format of a typical mobile release message is shown in FIG. 4. It should be understood that this figure is an example only and that other messages, message formats, or types may be used to convey similar information.

In this embodiment, the mobile release message 120 consists of a series of octets of data in three main sections: a header 130, a mobile identity 140, and a cause 150. In FIG. 4, the octets in each section are numbered in an octet column 160 and the bytes in each octet are numbered in a byte row 170. For example, bytes 0 through 7 of octet 2 of the header section 130 contain 'Length Indicator (LI)=<variable>', bytes 0 through 2 of octet 3 of the mobile identity section 140 contain 'Type of Identity=[101 (ESN), 110 (IMSI)]', etc.

The header section 130 contains information about the message 120 and is a typical feature of messages that follow the TIA-2001-C standard. Components of the header section 130 can include a message discrimination record, a length indicator record, and a message type record. The message type record might contain a code identifying the message as a mobile release message 120. The message type record might also indicate whether the mobile release message 120 applies to an early traffic channel scenario, a paging scenario, or an inter-technology page scenario or this information may be communicated in the cause code, which is discussed below.

The mobile identity section 140 identifies the mobile station to which the mobile release message 120 is to be sent. As mentioned previously, a message sent over a dedicated signaling link to a mobile station does not necessarily contain information identifying the mobile station to which the message is being sent since the base station can determine the mobile station to which the message is being sent by identifying the dedicated signaling link on which the message has been placed. When a dedicated signaling link is not present, as is the case when a mobile release message 120 is sent, some other means of identifying the mobile station to which the mobile release message 120 applies is needed. This information is provided in the mobile identity section 140 of the mobile release message 120. The mobile identity section 140 may contain any information that may be used by one or more of the base station 20 and/or AN 90 to identify the mobile station 30.

There are two general protocols for identifying a mobile station: through an electronic serial number, or ESN, or through an international mobile serial identifier, or IMSI. A mobile station will be identified by one or the other of these protocols, but not both. In an embodiment, bytes 0 through 2 of octet 3 of the mobile identity section 140 of a mobile release message 120 specify whether the mobile station to which a mobile release message 120 applies follows the ESN protocol or the IMSI protocol. The structure of the mobile identity section 140 differs depending on which protocol is followed.

If the mobile station to which a mobile release message 120 applies follows the ESN protocol, identity information about the mobile station is contained in sub-section 180 of the mobile release message 120. If the mobile station to which a mobile release message 120 applies follows the IMSI protocol, identity information about the mobile station is contained in sub-section 190 of the mobile release message 120. That is, either sub-section 180 or sub-section 190, but not both, of the mobile identity section 140 will be present depending on which protocol is used to identify the mobile station to which the mobile release message 120 is being sent.

The cause section 150 of a mobile release message 120 is a typical feature of messages that follow the TIA-2001-C standard. It contains a cause code that specifies other information such as the reason that an MSC is attempting to instruct a base station to release a mobile station. Additional information related to or describing the mobile release message or reasons for it being transmitted may be included in this section of the message.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system for wireless communication, comprising:
   a plurality of communications components each configured to:
      receive a page message from a mobile switching center via a non-signaling link prior to establishing a signaling link with the mobile switching center, the page message configured to instruct the communications component to attempt to locate a mobile station, and
      identify and release the mobile station based on a release message when another one of the communications components locates the mobile station, the release message configured to instruct the each communications component to stop attempting to locate the mobile station when no traffic channel exists between the communications component and the mobile station,
   wherein the release message format is compatible with a plurality of protocols and comprises at least one cause code that specifies the reason for the release of the mobile station to be released.

2. The system of claim 1, wherein the communications component comprises one of a base station and an access network.

3. The system of claim 2, wherein the release message includes identifier information identifying the mobile station that is to be released.

4. The system of claim 3, wherein the mobile switching center is configured to transmit the release message via the non-signaling link when a signaling link between the mobile switching center and one of the base station and access network has not yet been established.

5. The system of claim 1, wherein the communications component comprises a base station, the base station configured to receive the release message from the mobile switching center in the absence of a dedicated signaling link between the mobile switching center and the base station, and the release message conforms to a message protocol specified in Telecommunications Industry Association standard TIA-2001-C.

6. The system of claim 5, wherein the release message comprises:
   a header section comprising a message type code;
   a mobile identity section comprising information identifying the mobile station to which the release message relates, and an identity code specifying which of an electronic serial number protocol and an international mobile serial identifier protocol is used to identify the mobile station; and
   a cause section comprising information specifying the reason the mobile switching center is instructing the base station to stop attempting to locate the mobile station.

7. The system of claim 6, wherein the mobile identity section comprises an electronic serial number information sub-section when the identity code specifies that the electronic serial number protocol is used to identify the mobile station, and wherein the mobile identity section comprises an international mobile serial identifier information sub-section when the identity code specifies that the international mobile serial identifier protocol is used to identify the mobile station.

8. A method, comprising:
   receiving, by each of a plurality of communications components, a page message from a mobile switching center via a non-signaling link prior to establishing a signaling link with the mobile switching center, the page message configured to instruct the communications component to attempt to locate a mobile station;
   generating a release message for at least one of the communications components when another one of the communications components locates the mobile station, the release message configured to instruct the each communications component to stop attempting to locate the mobile station when no traffic channel exists between the communications component and the mobile station, the release message comprising information from which the mobile station is identified and at least one cause code that specifies the reason for stopping the attempt to locate the mobile station, the release message generated in a format that is compatible with a plurality of protocols; and
   sending the release message, via a non-signaling link communication, to the communications component before a signaling link is established between the communications component and the mobile switching station.

9. The method of claim 8, wherein the communications component comprises one of a base station and an access network.

10. The method of claim 8, wherein the release message conforms to a message protocol specified in Telecommunications Industry Association standard TIA-2001-C.

11. The method of claim 8, wherein sending the release message further comprises sending the release message to the communications component in response to determining that the signaling link between the communications component and the mobile switching center has not yet been established.

12. The method of claim 8, wherein the communication component comprises a base station, the method further comprising:

establishing, by the base station, a traffic channel with the mobile station, and before the base station establishes a signaling link with the mobile switching center, sending, from the mobile station, the release message to the base station via the non-signaling link to instruct the base station to stop attempting to locate the mobile station.

13. The method of claim 8, wherein the method further comprises:

communicating with the another communication component over a new signaling link in response to the another communication component locating the mobile station and establishing the new signaling link; and absent a signaling link with the each communication component, sending the release message to the each communication component to instruct the each communication component discontinuing attempts to locate the mobile station.

14. The method of claim 8, wherein the communications component comprises an access network in data communication with the mobile station, the method further comprising sending the release message to the access network to instruct the access network to cease data communication with the mobile station upon determining that the access network is continuing to attempt data communications with the mobile station after the mobile station has ceased to accept data from the access network.

15. A mobile switching center, comprising:

an interface for communicating with a plurality of communications components, wherein the mobile switching center is configured to:

transmit to each communications component, a page message that is configured to attempt to locate a mobile station, establish a traffic channel with one of the communications components that locates the mobile station, generate a release message for each of the other communications components that is configured to instruct the communications component stop attempting to locate the mobile station, via the page message, when no traffic channel exists between the communications component and the mobile station, the release message comprising information from which the mobile station is identified and at least one cause code that specifies the reason for the release of the mobile station to be released, the release message generated in a format that is compatible with a plurality of protocols, and transmit the release message, via a non-signaling link communication, to each of the other communications components before a signaling link is established between the communications component and the mobile switching station.

16. The mobile switching center of claim 15, wherein the communications component comprises one of a base station and an access network.

17. The mobile switching center of claim 15, wherein the mobile switching center is configured to send the release message to the communications component in the absence of a dedicated signaling link between the mobile switching center and the communications component.

18. The mobile switching center of claim 17, wherein the release message conforms to a message protocol specified in Telecommunications Industry Association standard TIA-2001-C.

19. The mobile switching center of claim 18, wherein the information from which the mobile station is identified is a mobile identity section that includes at least one of an identity code specifying which of an electronic serial number protocol and an international mobile serial identifier protocol identifying the mobile station.

20. The mobile switching center of claim 15, wherein the cause code specifies a scenario under which the release message is sent.

* * * * *

UNITED STATES PATENT AND TRADEMARK OFFICE
CERTIFICATE OF CORRECTION

| | | |
|---|---|---|
| PATENT NO. | : 8,285,299 B2 | Page 1 of 1 |
| APPLICATION NO. | : 11/272314 | |
| DATED | : October 9, 2012 | |
| INVENTOR(S) | : Semper et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 947 days.

Signed and Sealed this
Twenty-sixth Day of August, 2014

Michelle K. Lee
*Deputy Director of the United States Patent and Trademark Office*